3,145,229
PROCESS FOR THE PRODUCTION OF N-SUBSTI-
TUTED-1-PHENYLCYCLOHEXYLAMINES
Erik F. Godefroi, Detroit, and Robert F. Parcell, Ann
Arbor, Mich., assignors to Parke, Davis & Company,
Detroit, Mich., a corporation of Michigan
No Drawing. Filed Apr. 4, 1960, Ser. No. 19,477
3 Claims. (Cl. 260—570.5)

This application is a continuation-in-part of application Serial No. 684,849, filed September 19, 1957, and application Serial No. 710,388, filed January 22, 1958, both now abandoned, and the invention relates to a process for producing certain 1-phenylcyclohexylamine compounds which in their free base form have the formula,

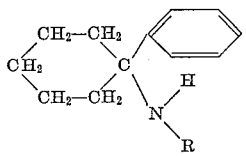

where R is an alkyl radical containing 1 to 4 carbon atoms, an allyl radical or an alkoxyalkyl radical containing 1 to 3 carbon atoms in the alkoxy group and 2 to 3 carbon atoms in the alkyl group.

In accordance with the invention 1-phenylcyclohexylamine compounds having the above formula and salts thereof are produced by reacting a Schiff base compound of formula,

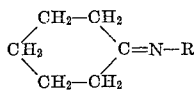

with a compound of formula,

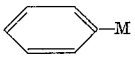

under substantially anhydrous conditions in a non-hydroxylic organic solvent and decomposing the resulting product by treatment with an aqueous medium; where R has the same significance as given above and M represents an alkali metal, preferably lithium.

Suitable non-hydroxylic organic solvents for carrying out the first phase of the process are aliphatic ethers such as diethyl ether and dibutyl ether; aromatic hydrocarbons such as benzene, toluene and xylene; tertiary amines such as triethylamine and pyridine; and mixtures of the same.

The temperature used during the first phase of the process is not critical. In most instances a satisfactory yield is obtained at temperatures between 0 and 100° C. The quantities of the two reactants is likewise not critical but it is preferable to use two equivalents or a slight excess (10 to 20%) of the phenyl alkali metal compound. If desired, the Schiff base starting material can be produced in situ either prior to or during the course of the first phase of the process. For example, one can react cyclohexanone with one equivalent of a primary aliphatic amine in a non-hydroxylic organic solvent while removing the water produced either by distillation or with a dehydrating agent and thereby obtain a solution of the Schiff base compound which can be used in the first phase of the process without isolation and/or purification of the Schiff base. Alternatively, one can react a 1-(alkylamino)cyclohexane carbonitrile compound with phenyl lithium in a non-hydroxylic organic solvent to produce the Schiff base compound which by reaction with the excess phenyl lithium present undergoes the first phase of the process of the invention. When using this modification of the invention two or slightly more equivalents of phenyl lithium are employed for each equivalent of the 1-(alkylamino)cyclohexane carbonitrile. Of the aforementioned two modifications of the process of the invention, the first gives the best results and is preferred.

The second or decomposition phase of the process is carried out by treating the reaction mixture with an aqueous medium. For this purpose water alone can be used or, if desired, acidic, basic or neutral aqueous solutions such as aqueous mineral acids, aqueous alkali metal hydroxides, aqueous alkali metal carbonates, aqueous alkali metal bicarbonates, aqueous alkali metal halides, ammonium hydroxide, aqueous ammonium chloride and the like can be used. The precise nature of the aqueous medium used is unimportant since the component which reacts to bring about the desired decomposition is the water present in the medium. When an acidic aqueous medium is used the product is obtained in the form of an acid addition salt whereas when a non-acidic aqueous medium, that is, a neutral or basic medium, is used the product is obtained as the free base.

When employing the above described process the 1-phenylcyclohexylamine compounds are usually obtained in the free base form. They can be isolated from the reaction mixture either in this form or as their salts with pharmaceutically-acceptable acids. If desired, such salts can also be prepared by reacting the isolated free base with the desired pharmaceutically-acceptable acid or by decomposing the reaction product with an aqueous medium containing a pharmaceutically-acceptable acid. Some examples of such acid addition salts with such acids are the mineral acid salts such as the hydrochloride, hydrobromide, sulfate and phosphate; organic acid salts such as the acetate, succinate, benzoate and p-toluene sulfonate; and salts with other strong acids uch as the sulfamate. The term "pharmaceutically-acceptable acid" designates an acid capable of being employed in the production of salts suitable for pharmaceutical use even though, in the case of a corrosive or strong mineral acid, it may not be acceptable for pharmaceutical use in and of itself. The expression "salts with pharmaceutically-acceptable acids" refers to chemical structure rather than to method of formation and includes such salts whether formed by neutralization or by other salt forming means.

The 1-phenylcyclohexylamine compounds and their non-toxic acid addition salts with pharmaceutically-acceptable acids produced by the process of the invention are useful in both veterinary and human medicine as anesthetic agents. They may be administered by the oral or parenteral routes. The term "non-toxic acid addition salt" as used herein means an acid addition salt which is not substantially more toxic than an equal weight of the free base of the 1-phenylcyclohexylamine compound from which it is derived.

The invention is illustrated by the following examples.

*Example 1*

A mixture consisting of 100 g. of anhydrous ethylamine and 220 g. of cyclohexanone is allowed to stand for 16 hours. The reaction mixture is shaken thoroughly with solid potassium hydroxide and the oil layer removed by decantation. Distillation of the oil layer in vacuo yields the desired N-ethylcyclohexylideneamine; B.P. 68–75° C. at 22 mm.

A solution of phenyl lithium (prepared from 11.2 g. of lithium and 76 ml. of bromobenzene in 500 ml. of ether) is added dropwise at 0° C. to a solution of 51 g. of N-ethylcyclohexylideneamine in 500 ml. of ether. After the addition has been completed, the reaction mixture is stirred for one hour and then decomposed by the addition of water. The ether layer is removed, washed with water and dried. The ether is evaporated and the residue distilled in vacuo to obtain the desired N-ethyl-1-phenylcyclohexylamine; B.P. 104–108° C. at 2.5 mm.

The hydrochloride salt of N-ethyl-1-phenylcyclohexylamine is prepared by dissolving the free base in an excess of isopropanolic hydrogen chloride, precipitating the salt with ether and recrystallizing the product so obtained from ether-isopropanol mixture; M.P. 236–237° C.

*Example 2*

98 g. of cyclohexanone is added to 90 ml. of allylamine at 0–5° C. The mixture is allowed to stand for 1 hour and then shaken with sodium hydroxide pellets. The water layer is removed and the oil distilled in vacuo to obtain the desired N-allylcyclohexylideneamine; B.P. 90–92° C. at 20 mm.

87 g. of N-allylcyclohexylideneamine in 150 ml. of ether is added slowly to a solution of phenyl lithium (prepared from 125 ml. of bromobenzene and 18.2 g. of lithium in 1000 ml. of ether). The reaction mixture is refluxed for 1 hour and then decomposed by the addition of water. The ether layer is removed, washed with water, dried and the ether evaporated. Distillation of the residue in vacuo yields the desired N-allyl-1-phenylcyclohexylamine; B.P. 120–123° C. at 3 mm.

The hydrochloride salt of N-allyl-1-phenylcyclohexylamine is prepared by dissolving the free base in an excess of isopropanolic hydrogen chloride and precipitating the salt with ether. After recrystallization from isopropanol-ether mixture, the salt melts at 208–209° C.

The hydrobromide salt of N-allyl-1-phenylcyclohexylamine is prepared by dissolving the free base in ether and treating the resulting solution with excess of dry hydrogen bromide. The crude product so obtained is purified by recrystallization from methanol-ether mixture.

*Example 3*

A mixture composed of 52 ml. of cyclohexanone, 45 g. of γ-methoxypropylamine and 200 ml. of benzene is subjected to azeotropic distillation until water ceases to be evolved. The benzene is distilled from the reaction mixture and replaced with an equal volume of ether to obtain an ether solution of the Schiff base of cyclohexanone and γ-methoxypropylamine.

The ether solution prepared above is added dropwise to a solution of phenyl lithium (prepared from 18.2 g. of lithium, 125 ml. of bromobenzene and 800 ml. of ether) and the reaction mixture refluxed for 20 minutes. The reaction mixture is decomposed by the addition of water, the ether layer removed and the aqueous phase extracted with ether. The combined ether layer and extracts are dried, the ether evaporated and the residue distilled in vacuo to obtain the desired N-γ-methoxypropyl-1-phenylcyclohexylamine; B.P. 142–146° C. at 2.5 mm.

10 g. of N-γ-methoxypropyl-1-phenylcyclohexylamine is dissolved in 100 ml. of ether and the solution treated with an excess of isopropanolic hydrogen chloride. The product which is N-γ-methoxypropyl-1-phenylcyclohexylamine hydrochloride is collected and purified by recrystallization from isopropanol-ether mixture; M.P. 193°C.

The sulfate salt of N-γ-methoxypropyl-1-phenylcyclohexylamine can be prepared by dissolving the base in an ethanol solution containing 1 equivalent of sulfuric acid. The salt is precipitated by the addition of ether and purified by recrystallization from methanol-ether mixture.

*Example 4*

A mixture consisting of 49 g. of cyclohexanone, 60 g. of γ-isopropoxypropylamine and 250 ml. of benzene is subjected to azeotropic distillation until water ceases to be evolved to obtain a solution containing the Schiff base of γ-isopropoxypropylamine and cyclohexanone. The benzene is removed by distillation and replaced with an equal volume of ether. The ether solution so obtained is added dropwise with stirring to 0.75 mole (63 g.) of phenyl lithium in 600 ml. of ether. The reaction mixture is stirred for 2 hours, decomposed by the addition of water and the ether layer separated. The ether layer is dried, the ether evaporated and the residue distilled in vacuo to obtain the desired N-γ-isopropoxypropyl-1-phenylcyclohexylamine; B.P. 132–136° C. at 0.1 mm.

The hydrochloride salt of N-γ-isopropoxypropyl-1-phenylcyclohexylamine can be prepared by adding the free base to an excess of isopropanolic hydrogen chloride and precipitating the salt with ether. The crude salt so obtained is purified by recrystallization from isopropanol-ether mixture.

*Example 5*

A mixture consisting of 60 g. of β-methoxyethylamine, 83 ml. of cyclohexanone and 250 ml. of benzene is subjected to azeotropic distillation until water ceases to be evolved. The benzene is distilled from the reaction mixture containing the Schiff base of cyclohexanone and β-methoxyethylamine and replaced with an equal volume of ether. The ether solution so obtained is added dropwise to 101 g. of phenyl lithium in 1 liter of ether and the reaction mixture stirred for two hours. The reaction mixture is decomposed by the addition of water, the ether layer separated and the ether layer washed with water. After drying the ether is distilled from the solution and the residue distilled in vacuo to obtain the desired N-β-methoxyethyl-1-phenylcyclohexylamine; B.P. 102–105° C. at 1 mm.

The hydrochloride salt of N-β-methoxyethyl-1-phenylcyclohexylamine can be obtained by adding the free base to an excess of isopropanolic hydrogen chloride followed by precipitation of the salt with ether. After recrystallization from isopropanol-ether mixture the salt melts at 201–202° C.

The p-toluenesulfonate salt of N-β-methoxyethyl-1-phenylcyclohexylamine can be prepared by dissolving the free base in isopropanol and adding the solution to an isopropanolic solution containing an excess of p-toluenesulfonic acid. The salt is precipitated by the addition of ether and purified by recrystallization from methanol-ether mixture.

*Example 6*

A mixture consisting of 196 g. of cyclohexanone and 150 g. of isopropylamine is allowed to stand overnight in a stoppered flask at room temperature. The reaction mixture is shaken thoroughly with 200 g. of solid potassium hydroxide and the organic layer removed by decantation. After standing overnight the organic layer is again shaken with 200 g. of solid potassium hydroxide, separated and then distilled under reduced pressure to obtain the desired N-isopropylcyclohexylideneamine; B.P. 66–8° C. at 20 mm.

139 g. of N-isopropylcyclohexylideneamine in 400 ml. of ether is added with stirring to 1.5 moles of phenyl lithium in 1.5 liters of ether and the reaction mixture stirred for four hours. The reaction mixture is decomposed by the cautious addition of 500 ml. of water and the ether layer separated. After drying over potassium carbonate the ether is evaporated and the residue distilled in vacuo to obtain the desired N-isopropyl-1-phenylcyclohexylamine; B.P. 99–101° C. at 0.9 mm.

The hydrochloride salt of N-isopropyl-1-phenylcyclohexylamine is prepared by dissolving the free base in ether and treating the resulting solution with an excess of dry hydrogen chloride. The crude product so obtained is purified by recrystallization from isopropanol and ether mixture; M.P. 234–235° C.

The benzene sulfonic acid salt of N-isopropyl-1-phenylcyclohexylamine can be prepared by dissolving the free base in a small amount of isopropanol and adding the solution to an isopropanol solution containing an excess of benzenesulfonic acid. The crude salt is precipitated by the addition of ether and purified by recrystallization from methanol-ether mixture.

*Example 7*

A mixture of 196 g. of cyclohexanone, 146 g. of n-butylamine, and 600 ml. of benzene is refluxed under a water trap until 36 ml. of water has been removed. The solution of N-n-butyl-cyclohexylideneamine is added to a previously prepared, stirred solution of three moles of phenyl lithium in 3 liters of ether. The resulting solution is stirred and refluxed for two hours and then decomposed by the cautious addition of 500 ml. water. After thorough stirring, the organic layer is removed and evaporated on the steam bath. The residue is distilled under reduced pressure to provide pure N-n-butyl-1-phenylcyclohexylamine.

*Example 8*

A mixture consisting of 196 g. of cyclohexanone and 200 g. of sodium meta bisulfite in 750 ml. of water is stirred for two hours at room temperature and then cooled to 0° C. A solution of 137 g. of potassium cyanide in 300 ml. of water and 100 g. of ethylamine are added dropwise with stirring keeping the temperature at 0–10° C. The reaction mixture is stirred for one and one half hours and then allowed to stand in the refrigerator for several days. The 1-ethylaminocyclohexane carbonitrile so obtained is extracted with several volumes of ether, the ether solution dried and the ether evaporated. Distillation of the residue in vacuo yields the desired 1-ethylaminocyclohexane carbonitrile; B.P. 70–71° C. at 1.2 mm.

152 g. of 1-ethylaminocyclohexane carbonitrile in 400 ml. of dry ether is added to 1.5 l. of a 3 N solution of phenyl lithium in ether. After the addition has been completed the reaction mixture is refluxed and stirred for about 6 hours and then allowed to stand at room temperature overnight. Water is added to the reaction mixture to decompose the reaction product and the ether layer is separated. The aqueous layer is extracted with several portions of ether and the extracts combined with the main ether layer. The ether solution is washed with water and then extracted with dilute hydrochloric acid. The aqueous acid extracts are washed with ether and then made alkaline with an excess of sodium hydroxide solution. The oil which separates is extracted with ether, the ether extracts washed with water and dried. The ether is removed from the extract by distillation and the residue distilled in vacuo to obtain the desired N-ethyl-1-phenylcyclohexylamine; B.P. 114–116° C. at 5 mm.

Hydrochloride salt of N-ethyl-1-phenylcyclohexylamine can be prepared by adding the free base to an excess of isopropanolic hydrogen chloride and precipitating the salt by the addition of ether. Recrystallization from ether and isopropanol mixture gives the desired salt in pure form; M.P. 236–237° C.

We claim:
1. Process for the production of a 1-phenylcyclohexylamine compound having in the free base form the formula,

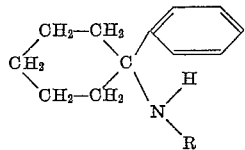

which comprises reacting a Schiff base compound of formula,

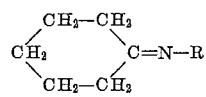

with a compound of formula,

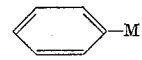

under substantially anhydrous conditions in an inert organic solvent and decomposing the resulting product by treatment with an aqueous medium; where R is a member of the class consisting of alkyl radicals containing 1 to 4 carbon atoms, the allyl radical and alkoxyalkyl radicals containing 1 to 3 carbon atoms in the alkoxy group and 2 to 3 carbon atoms in the alkyl group and M is an alkali metal.

2. Process for the production of a 1-phenylcyclohexylamine compound having in the free base form the formula,

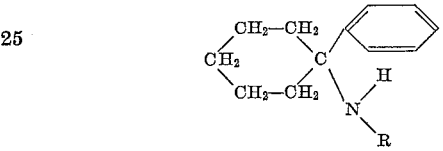

which comprises reacting a Schiff base compound of formula,

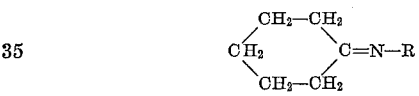

with phenyl lithium under substantially anhydrous conditions in an inert organic solvent and decomposing the resulting product by treatment with an aqueous medium; where R is an alkyl radical containing 1 to 4 carbon atoms.

3. Process for the production of N-ethyl-1-phenylcyclohexylamine which comprises reacting N-ethylcyclohexylideneamine with phenyl lithium under substantially anhydrous conditions in an aliphatic ether solvent and decomposing the resulting product by treatment with a member of the class consisting of neutral and basic aqueous media.

References Cited in the file of this patent

UNITED STATES PATENTS 2,711,428    Goodson et al. _____ June 21, 1955

FOREIGN PATENTS 565,260    Belgium _____ Aug. 28, 1958

OTHER REFERENCES

Kursonov: "Chemical Abstracts," vol. 1, pp. 2092–2093 (1907).